United States Patent
Anderson et al.

[11] Patent Number: 6,128,745
[45] Date of Patent: Oct. 3, 2000

[54] POWER MANAGEMENT INACTIVITY MONITORING USING SOFTWARE THREADS

[75] Inventors: Eric Christopher Anderson, Sunnyvale; Henri Hayim Farhi, Los Gatos, both of Calif.

[73] Assignee: Phoenix Technologies Ltd., San Jose, Calif.

[21] Appl. No.: 09/084,915

[22] Filed: May 28, 1998

[51] Int. Cl.$^7$ .................................................. G06F 1/32
[52] U.S. Cl. ................................. 713/323; 713/324
[58] Field of Search .............................. 713/300, 310, 713/320, 321, 322, 323, 324, 502

[56] References Cited

U.S. PATENT DOCUMENTS

| | | | |
|---|---|---|---|
| 5,404,546 | 4/1995 | Stewart | 395/750 |
| 5,471,621 | 11/1995 | Ohtsuki | 713/323 |
| 5,560,022 | 9/1996 | Dunstan et al. . | |
| 5,586,332 | 12/1996 | Jain et al. | 713/322 |
| 5,590,342 | 12/1996 | Marisetty | 713/324 |
| 5,655,126 | 8/1997 | Glenning | 395/750.06 |
| 5,721,935 | 2/1998 | DeSchepper et al. | 713/323 |
| 5,752,050 | 5/1998 | Hernandez et al. . | |
| 5,832,286 | 11/1998 | Yoshida | 713/324 |
| 5,884,087 | 3/1999 | White et al. | 713/310 |
| 5,905,900 | 5/1999 | Combs et al. | 713/320 |

FOREIGN PATENT DOCUMENTS

| | | |
|---|---|---|
| 0 522 483 A2 | 1/1993 | European Pat. Off. . |
| 0 670 539 A1 | 9/1995 | European Pat. Off. . |

OTHER PUBLICATIONS

Tatsu, Nakazato, JP doc. No. 10124201, May 15, 1998, *Patent Abstracts of Japan*.

*Primary Examiner*—Glenn A. Auve
*Attorney, Agent, or Firm*—Foley & Lardner

[57] ABSTRACT

A method for managing power in an electronic system having a plurality of input/output devices, each of the input/output devices having a full power-on state and at least one power reduction state and each being controlled by an associated device driver, the method comprising the steps of: initializing a power management logic separate from the device drivers to receive at least one time-out value for each of the device drivers to be subject to power management; assigning a different timer in the power management logic to a different one of the device drivers to be subject to power management, the timers being disposed external of the device drivers; initializing each of a plurality of the assigned timers to individual predetermined value set in accordance with the at least one time out value of the assigned device driver for that timer; changing the individual predetermined value held in each of the timers at a predetermined interval; monitoring a plurality of the timers and determining when the predetermined value in one of the timers indicates that the time-out value for the assigned device driver has elapsed, and sending a power reduction instruction to the assigned device driver; and resetting a given one of the timers to its individual predetermined value at any time when the device driver associated with the timer indicates a usage event of its associated device driver, and powering the associated device to a higher power level if it is not at full power-on.

25 Claims, 3 Drawing Sheets

POWER MANAGEMENT INACTIVITY MONITORING USING SOFTWARE THREADS

FIELD OF THE INVENTION

The present invention relates generally to the field of power management, and more particularly, to the field of power management of devices connected to an electronic system.

BACKGROUND OF THE INVENTION

The conservation of power in microprocessor-based systems sourced by batteries or other limited power supplies has been a continuous, iterative, and progressive science. As system functionality has improved, users have integrated those systems into their lives, resulting in increased power demand. Balancing increased functionality against this increased power demand requires a combination of innovative hardware design and software methods to both deliver the capabilities the user requires while minimizing the energy used to deliver it. Although systems have changed through the years, from luggable PCs to notebooks and a variety of hand held information appliances, the opposing forces of increasing user expectations and system power demands have not.

A variety of systems ranging from embedded controllers to screen phones and data enabled phones to the latest incarnation of the "PDA," the Hand Held PC, have significant power efficiency requirements, particularly in the last category of device.

User demand for system capabilities has driven power consumption in the past and will drive power consumption on these systems in the future. Higher contrast (or backlit, or color) displays, high speed infrared transceivers, more advanced audio functions with on-board amplification, bigger cache memory sub-systems, I/O coprocessor and higher speed processors are examples of components that increase power consumption in systems. In addition, higher speed net connections quickly dissipate the energy of a battery.

In the prior art, the power management of devices attached to an electronic system, such as a computer, has typically been accomplished in a way that is processor and operating system dependent, and generally with the use of dedicated silicon in the system. Such prior art power management systems use costly hardware timers, and a mechanism called SMI (system management interrupt) mode which is unique to the X86 processor architecture. A combination of hardware timers is used, with one timer disposed on each device to be power managed. Each of the timers is set to generate either an SMI or an IRQ to notify a device driver associated with that device or firmware code, when some power management event has occurred for that device.

A power management framework has been designed into Windows CE™ operating system. The Windows CE operating system defines a variety of APIs for applications and drivers to call to invoke power management events. Because Windows CE is designed to be run on a variety of CPU architectures, there is no reliance on traditional X86 power management triggers, such as SMI (system management interrupt) or an Advanced Power Management compliant method of communicating power managed events.

With this cross platform architecture, Windows CE has focused power management on simplified system power state definitions and relies on individual device drivers and application OPEN/CLOSE actions to control power to system devices. For example, when an audio I/O device is called, the OPEN/CLOSE actions of the application can turn the audio device ON/OFF. In the case of the running of multiple applications, however, there are scenarios where devices will remain OPEN or ON even though they are not in use. In this situation the power efficiency of the system drops.

User interaction to control power in Windows CE is via a Control Panel (or status bar icon) applet that enables the user to set the overall SUSPEND/OFF time-out of the system and view the basic battery status.

However, a problem for developers of Windows CE systems is that all of the code below the Windows CE defined API must be developed for each device, for each CPU, and for each OEM platform by either an OEM or by a third party.

Accordingly, the prior art power management systems are either processor specific or operating system specific. The deployment of such systems is costly and complex and places an undue burden on chipset vendors.

SUMMARY OF THE INVENTION

Briefly, the present invention comprises in one aspect, a method for managing power in an electronic system that includes a processor, operating systems software controlling the processor and capable of controlling a plurality of input/output devices, each of the input/output devices having a full power-on state and at least one power reduction state and each being controlled by an associated device driver, the method comprising the steps of: loading power management application (PMA) software, communication software, and template software into the electronic system; wherein the template software includes a data structure for a name, a time-out value for a full power-on state and in API for power up or power lower for the device; wherein the communication software is loaded into the device drivers of devices that are to be subject to power management and functions to facilitate communication between the device and the PMA software; wherein the template software is functional to translate the API of the device to an API of the communication software; initializing code in the communication software in each of the device drivers to be subject to power management to create a thread for its device driver with a specific ID in order to support asynchronous communication with the PMA software; initializing the PMA software with at least the full power-on time-out value for each of the device drivers subject to power management; associating in the PMA software a different timer with each of a plurality of the device drivers subject to power management, the timers being external to the device drivers, and initializing each of the timers in accordance with the time-out value for its associated device driver; monitoring each of the timers and if a given one of the timers associated with a given one of the device drivers has a value indicative that its time-out value has been reached, then awakening the thread for the given device driver; the given device driver having the awakened thread acting to call the PMA software for instructions; the PMA software instructing the given device driver upon receipt of the call to lower at least one power level; and resetting a particular one of the timers when the device driver associated with the timer indicates a usage event for its associated device, and powering to a higher power the associated device if it is not at a full power-on state.

In a further aspect of this embodiment, the at least one of the input/output devices includes at least two different power reduction states; and wherein the template software in the loading step includes a reduction state time-out value for one of the power reduction states; wherein the PMA software initializing step includes the step of providing the time-out value for the one of the power reduction states to the PMA software; and further comprising steps of: the communication software for giving one of the device drivers notifying the PMA software of a change to a different power level in response to a PMA software instructing step; setting the timer associated with the given device driver in accordance with the time-out value for the one of the power reduction states; and monitoring when the timers set in accordance with the time-out value for the one of the power reduction states has reached a value indicative that the reduction state time-out value has elapsed, and then awakening the thread for that associated device driver.

In a further aspect of the present invention, the method includes the steps of detecting when the electronic system is obtaining power from a non-battery power source; and upon this detection, operating the device driver without the PMA software performing any power-lower functions based on time-outs.

In a further aspect of the present invention, the method comprises the step of if a designated one of the devices is to be powered to a higher power, causing a second device driver that is subject to power management to power its associated device to a higher power, if the second device is not at full power-on.

In yet a further aspect of the present invention, the method comprises the steps of: maintaining a log of a number of indications of power-up events for at least one device driver subject to power management over a period of time; and varying at least one time-out value for the at least one device driver in accordance with the number of indications of power-up events of the at least one device driver during the period of time.

In yet a further aspect of the present invention, the timers are implemented by a plurality of memory locations; wherein the initializing step comprises the step of loading each of a plurality of the memory locations with the respective full power-on time-out value for the device driver to which the timer is associated; wherein the changing value step comprises the step of decrementing the memory locations at a predetermined interval; and wherein the monitoring step comprises the step of monitoring the memory locations to determine when one of the memory locations has been decremented to zero.

In a yet further aspect of the present invention, the loading step includes the step of adding the template software to the device drivers that are subject to power management.

In a further embodiment of the present invention, a method is provided for managing power in an electronic system having a plurality of input/output devices, each of the input/output devices having a full power-on state and at least one power reduction state and each being controlled by an associated device driver, the method comprising the steps of: initializing a power management logic separate from the device drivers to receive at least one time-out value for each of the device drivers to be subject to power management; assigning a different timer in the power management logic to a different one of the device drivers to be subject to power management; the timer being disposed external of the device drivers; initializing each of a plurality of the assigned timers to an individual predetermined value set in accordance with the at least one time-out value of the assigned device driver for that timer; changing the individual predetermined value held in each of the timers at a predetermined interval; monitoring a plurality of the timers and determining when the predetermined value in one of the timers indicates that the time-out value for the assigned device driver has elapsed and sending a power reduction instruction to the assigned device driver; and resetting a given one of the timers to its individual predetermined value at any time when the device driver associated with the timer indicates a usage event of its associated device driver, and powering the associated device to a higher power level if it is not at full power-on.

In yet a further aspect of the present invention, a program product is provided comprising: at least one computer usable medium having computer readable program code means embodied therein for configuring a computer to manage power, wherein operating system software controls the computer and is capable of controlling a plurality of input/output devices, each of the input/output devices having a full power-on state and at least one power reduction state and each being controlled by an associated device driver, the computer readable program code means comprising: PMA computer readable program code means for causing the computer to form a different timer for each of a plurality of the devices subject to power management, the timer being formed external to the device drivers associated with the devices; first computer readable code means for causing the computer to initialize each of the different timers in accordance with the time-out value of the device associated with that timer; second computer readable code means to cause the computer to run the timers, to monitor the timers, and to determine when one of the timers has a value indicative that the time-out value for its associated device has elapsed, and sending a power reduction instruction to the associated device; and third computer readable code means for causing the computer to reset a given one of the timers to the time-out value for its associated device at any time when the device driver associated with the timer indicates a usage event of its associated device, and powering the associated device to a higher power level if it is not at full power-on.

In yet a further aspect of the present invention, a program product is provided comprising: at least one computer usable medium having computer readable program code means embodied therein to configure a computer to manage power, wherein operating system software controls the computer and is capable of controlling a plurality of input/output devices, each of the input/output devices having a full power-on state and at least one power reduction state and each being controlled by an associated device driver, the computer readable program code means in the program product comprising: first computer readable code means designed to be added to each of the device drivers that is subject to power management, the first computer readable code means including a data structure for a name and at least one time-out value for a full power-on state and an API for power-up or power-lower for the device, the first computer readable code means functional to cause the computer to translate the API of the device to an API of a second computer readable code means; the second computer readable code means designed to be added to each of the device drivers that is subject to power management to facilitate communication between a power management application (PMA) computer readable code means and the device associated with the device driver, the second computer readable code means having an API; third computer readable code means to cause the computer to initialize the second computer readable code means to create a thread for its device driver with a specific ID in order to support asynchronous communication with the PMA computer readable code means. The PMA computer readable code means to cause the computer to provide a separate timer associated with each of the device drivers, but external to the device drivers; wherein the second computer readable code means includes code to cause the computer to initialize the PMA computer readable code means to associate the full power-on time-out value for each of the devices with a different one of the timers; wherein the PMA computer readable code means includes code to cause the computer to monitor each of the timers and if a given one of the timers associated with a given one of the device drivers has a value indicative that its time-out value has been reached, then awakening the thread for the given device driver associated with that time-out value; wherein the third computer readable code means includes code to cause the computer to call the PMA computer readable code means for instructions upon awakening of the thread; wherein the PMA computer readable code means includes code to cause the computer to communicate to the second computer readable code means of the given device driver upon receipt of the call to lower at least one power level; and wherein the PMA computer readable code means includes code to cause the computer to reset a particular one of the timers when the second computer readable code means of the device driver associated with the timer indicates a usage event for its associated device, and communicating to the device driver to power to a higher power if it is not at a full power-on state.

DETAILED DESCRIPTION OF THE PREFERRED EMBODIMENTS

The following definitions will be helpful in explaining the context and terminology of the present invention.

Thread means computer code comprising a chain of execution running within the context of a task and having a particular ID, and that may be put to sleep to await the occurrence of a particular awakening event.

Awakening Event means the signaling of a thread by some means such as an operating system supplied signal.

Library means a set of code that has been compiled and linked to form a set of machine-usable utilities.

Usage Event means the detection of usage or a request for usage of a device.

Template Software means a source file that can be modified to support a particular driver by translating the API of the particular device driver to the API of the Library.

Power Reduction State means a power state that is less than full power-on, and includes the power off state.

API means an application programming interface through which input is received or output provided to a device.

The present invention is designed to provide automatic power management in an electronic system for a set of input/output devices that are under the control of associated device drivers. The power management application function is disposed external to the input/output devices and their associated drivers and is preferably centralized under the control of power management application (PMA) software.

Each input/output device that is to be subject to power management must have its associated device driver loaded with software and initialized to allow it to communicate with and be subjected to control by the power management application (PMA) software. Also, each device driver to be subject to power management must be registered with the PMA software to facilitate this communication and control. One feature of the present invention is to reduce complexity, particularly for the installation or replacement of input/output devices to be inserted into a system configuration.

The initialization process for an individual input/output device comprises the physical addition of communication software with an API to a device driver associated with the input/output device that is to be subject to power management. Means are included for converting the API for the input/output device to the API for this communication software. In a preferred embodiment, the converting means is a template file in human legible form for receiving the API of the device. This template file is preferably physically added to the device driver, although it could be separate from and designated to communicate with the device driver. Note that the communication software is generic, with well-defined API entry points. The template file facilitates calls between the device and the API entry points of the communication software.

The communication software typically will comprise set state software to call the PMA software to report that the I/O device associated with this device driver has just made a power state transition. The communication software will generally also include usage event report software that is designed to report to the PMA software that a usage event has occurred, i.e., that the I/O device is being used or that a request for usage has been made. Additionally, the communication software should include set power software, designed to be an entry point for the reception of calls from the PMA software to power up or to power lower the associated device. Software is also necessary to communicate the time out values for the different power states of the I/O device to the PMA software. Finally, in a preferred embodiment initialization software is necessary to create a device thread in the communication software that may be activated by a signal from the PMA software. A thread is created by calling the operating system and telling it to create a thread with a particular ID that is awakened on the occurrence of a time out event in the PMA software.

In a preferred embodiment, the communication software comprises library software, which is code that has been compiled and linked to form a set of machine-readable utilities.

With respect to the template file, that file includes code or a table to translate the internal I/O device call to power up to the appropriate call (API entry point) for that function in the communication software, and likewise translates the internal I/O device call for power lower to the appropriate call (API entry point) for that function in the communication software. Additionally, the template file is designed to receive, automatically or by manual input, the name of the I/O device, and time out values for each power state of the I/O device. In some embodiments, a number representative of the number of power states may be input and/or the minimum and maximum time out values possible for the power states of the I/O device may be provided.

Figure 1:
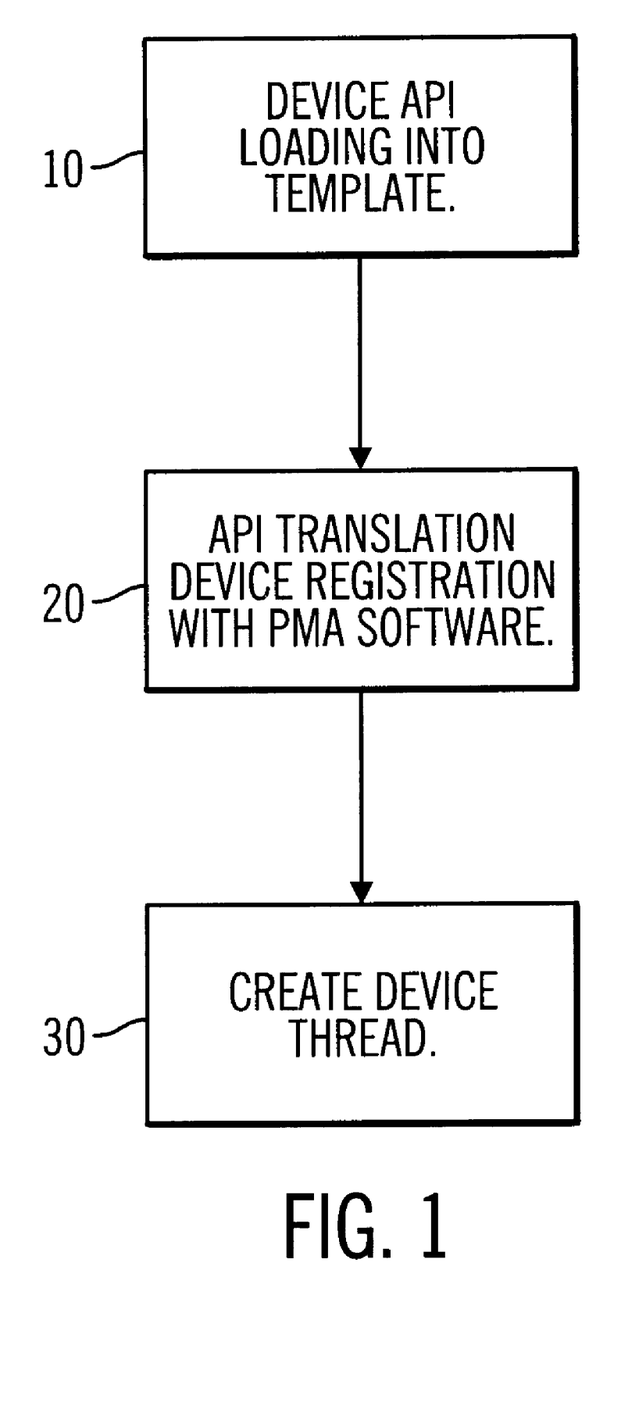
FIG. 1 is a flow-chart diagram of an initialization process in accordance with the present invention.

The initialization routine to facilitate power management is illustrated diagrammatically in FIG. 1. Block 10 entails either the automatic or manual loading of the API for the device, including its name, and power on and power lower device calls, as well as the time-out values for the power states of the device into the template. If the time out values are to be dynamically reconfigured by an application program, the minimum and maximum time out values for the device may be loaded. This step could be accomplished simply by loading and reading a file generated by the I/O device manufacturer.

After this loading step, the I/O device API must be translated in block 20 to the API entry points for the communication software. To accomplish this, the communication (library) software is invoked and the data structure that defines the device (time out values, number of states, type of driver, etc.) and the entry points/calls of the device for power up and power lower are translated to the communication software API.

Then the communication software registers the I/O device with the PMA software. The registration process entails providing the name of the I/O device and the time out values for the device to the PMA software. In a preferred embodiment, a part or all of the data structure used to represent that I/O device is provided to the PMA software.

Block 30 then creates a device thread for that I/O device to handle PMA software time out events. Typically, the device thread in this context can be viewed as code that is capable of waiting on a timer thread in the PMA software. The device thread may be created by placing a call to the operating system with an instruction to create a thread with a particular ID that is awakened on the occurrence of a time out event in the PMA software. With this process, a timer thread is also created for the PMA software. The timer thread includes a device thread ID and supports a timer to be associated with that device.

The PMA software functions, when loaded into the electronic system, to create a device inactivity power management method, apparatus and software that leverage the CPU of the electronic system by emulating I/O device power management timers, but is external to the I/O devices themselves and their drivers. This design permits the software to add multiple activity timers for numerous system devices long after the initial configuration is shipped, and to take those inactivity timers through predefined power management modes. Accordingly, a failsafe method is provided to ensure that I/O devices will not be powered when they are not used.

The emulated timers of the PMA software may be implemented using a variety of techniques. For example, the timers may be implemented via standard software or hardware counters. In a preferred embodiment, the timers may be implemented in a memory-mapped file or in a buffer. In this preferred embodiment, a particular memory location in RAM is associated with each I/O device that is to be power managed. That particular memory location is initialized in accordance with a first time out value for that device. Note that there may be a time out value for each power state of the device (although the power off state typically will not have a time out value associated with it). For example, for a particular device there may be a first time out value associated with the full power on state. There may be a second time out value associated with a first standby power state. There may be a third time out value associated with a lower power second standby power state. There may be a significant number of power states, and associated time out values, depending on the particular device involved.

During device registration with the PMA software, a particular memory location is associated with that device and is loaded with a predetermined value based on the first time out value for that device. The value held in the memory location is then changed up or down in accordance with predetermined time increments until a value is reached that is indicative that the time out value for that device has elapsed. In one implementation, the particular memory location is loaded with the first time out value itself, and that value is decremented until that memory location holds a zero value.

When the memory location for the device holds a value indicative that the first time out value has elapsed, then in one embodiment, a signal may be sent directly to the device driver for that particular device to cause it to lower the power state by one or more levels. Then the timer is loaded with a value in accordance with the second time out value.

However, in a preferred embodiment, the thread ID for that particular device driver is used to open a timer event which is pulsed, thereby awakening the device thread with that thread ID.

The awakened device thread responds by calling the PMA software for instructions. The PMA software responds to this call by sending an instruction to the communication software in the device driver (by way of example, via a memory mailbox location for that device, as defined in the call) to lower the power state by one or more levels. When the device is set to this lower power state, then the communication software in the device driver sends a signal to the PMA software indicating that the device has been set to a lower power level. The PMA software responds by loading the second time out value for that device (if there is one) into its associated timer memory location in RAM. That memory location is then changed until a value is reached indicative that the second time out value has elapsed. The same sequence is then followed to lower the power state by one or more levels and reload the memory location with a third time out value (if there is one).

The communication between the communication software and the PMA software via thread signaling by the PMA software and calls from the communication software is advantageous because it minimizes complexity. Specifically, it allows the PMA software to communicate primarily by signaling, to thereby conserve processing time, while causing the multiple device drivers to handle the calls. Thus, the PMA software will initially signal to the thread in a particular device driver, without expending any more resources. If that particular device that is signaled is disabled, no further processing time is required. However, once the thread for that device is awakened and calls to the PMA software, only then will the PMA software load a code into the memory mailbox location designated by that call.

Note that if there is a usage event for the particular device and that device is not in the full power-on state, then that device is powered to a higher power state, typically the full power-on state. Additionally, its associated timer is reset to the time out value for that higher power state, i.e, for full power-on, it is set to the first time out value. For example, if the particular device is operating in the standby power state, it may be powered up to full power-on and its associated timer reset to the first time out value. Note that it is possible to implement the software so that the power is not necessarily raised to full power on, but rather is raised by a predetermined number of power states and the associated timer set to the timeout value for that state.

In a preferred embodiment, all of the timers are incremented or decremented in accordance with the system time or the operating system timer service for the electronic system. In one embodiment, the incrementing or decrementing can be done under control of the system clock. The incrementing or decrementing function can also be implemented by scheduling a task that obtains control at a particular time interval, i.e., once every second.

Note that the implementation of the present invention using threads is particularly advantageous because it isolates the I/O device from all but the immediately adjacent software layer, thereby significantly decreasing the changes necessary to add I/O devices into the power management system.

Software may also be provided in the PMA software to provide an API to allow an application program running on top of the operating system for the electronic system to obtain information from the PMA software about the names of device drivers that are being power managed, and the time out values being used by those devices. This software may also include code to dynamically reconfigure the power management of the I/O devices being power managed by the PMA software and/or simply to display the power managed I/O configuration and/or its current power managed state. Alternatively, software may be provided merely to set the power state of individual I/O devices via this API.

The PMA software may also include code to automatically power up to full power-on an I/O device that is not already at the full power-on state if another designated I/O device indicates a usage event. For example, a screen could be powered to the full power-on state if a usage event is detected for a mouse.

Figure 2:
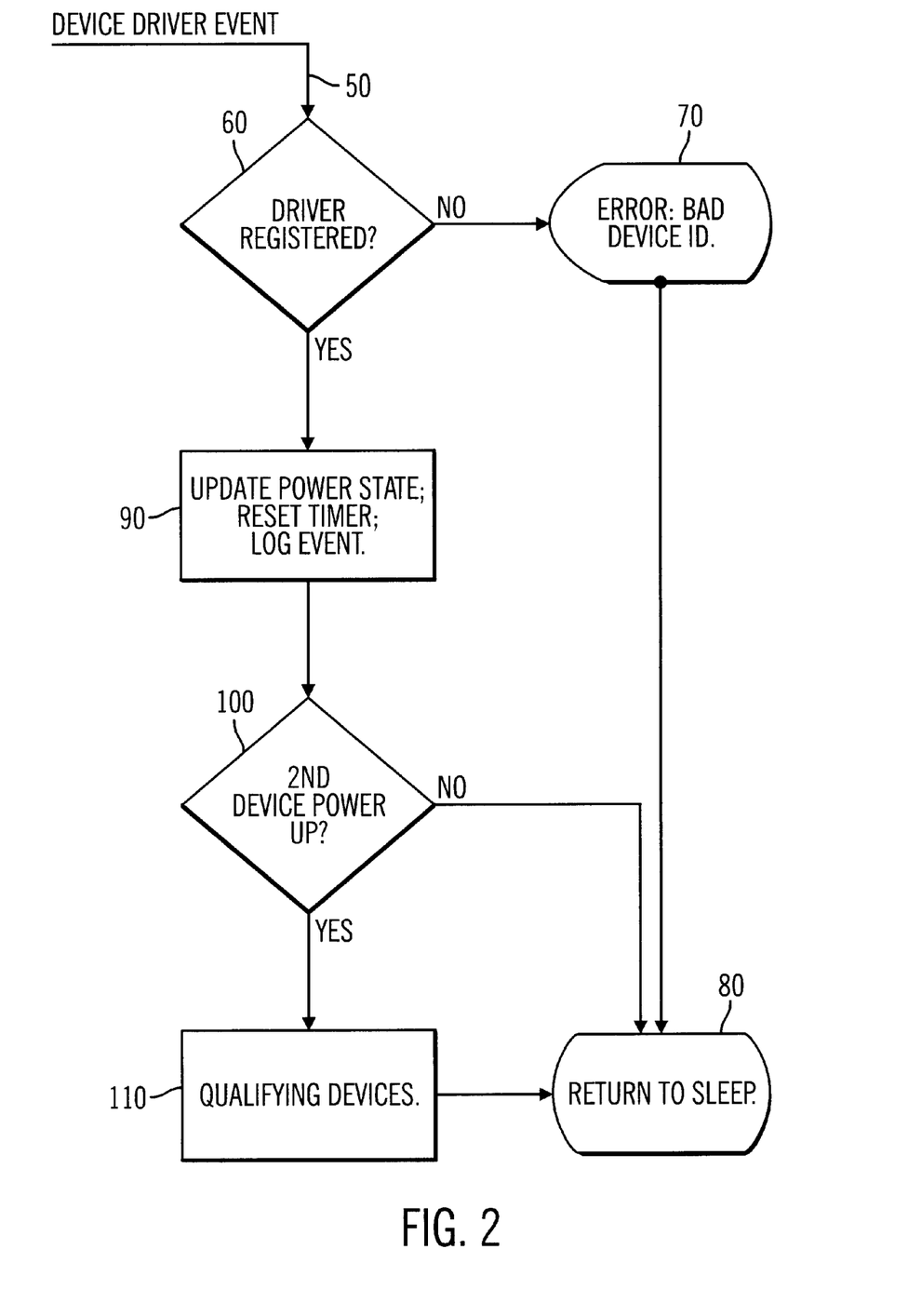
FIG. 2 is a flow chart diagram of a power management process in accordance with the present invention.

FIG. 2 is a flowchart of operations at the PMA software when a usage event is detected for a particular device driver. Upon the occurrence on line 50 of a usage event from a particular device driver, the PMA software determines in decision block 60 whether that device driver is subject to power management (i.e., has that device driver been registered with the PMA software). If the answer is NO, then the logic flow goes to an error block 70 and then to a return to sleep block 80. If the answer is YES, then the logic flow goes to block 90. Block 90 determines if the power state is less than a designated power state, or in a preferred embodiment, less than full power-on, and if so, changes the power state to full power-on. It also resets the emulated timer associated with that device to the associated time-out value for that new power state. In a preferred embodiment, block 90 may also log the event. Such usage event logging can be used to change the time out values for that particular device based on a threshold number of usage events, or in accordance with some other algorithm, to thereby optimize the power management function for that device.

In a further aspect of the invention noted previously, the logic flow could go to a decision block 100 to determine whether the particular device that had the usage event has an associated I/O device that should be powered to a higher power such as full power-on in that situation. For example, if the usage event occurred for a mouse, then the power state of the display screen may be changed to full power-on. If the answer is NO, then the logic flow goes to the return to sleep block 80. If the answer is YES, then the logic flow goes to block 110 and the qualifying associated I/O device is powered up to full power-on. Then the logic flow goes to the return to sleep block 80.

Figure 3:
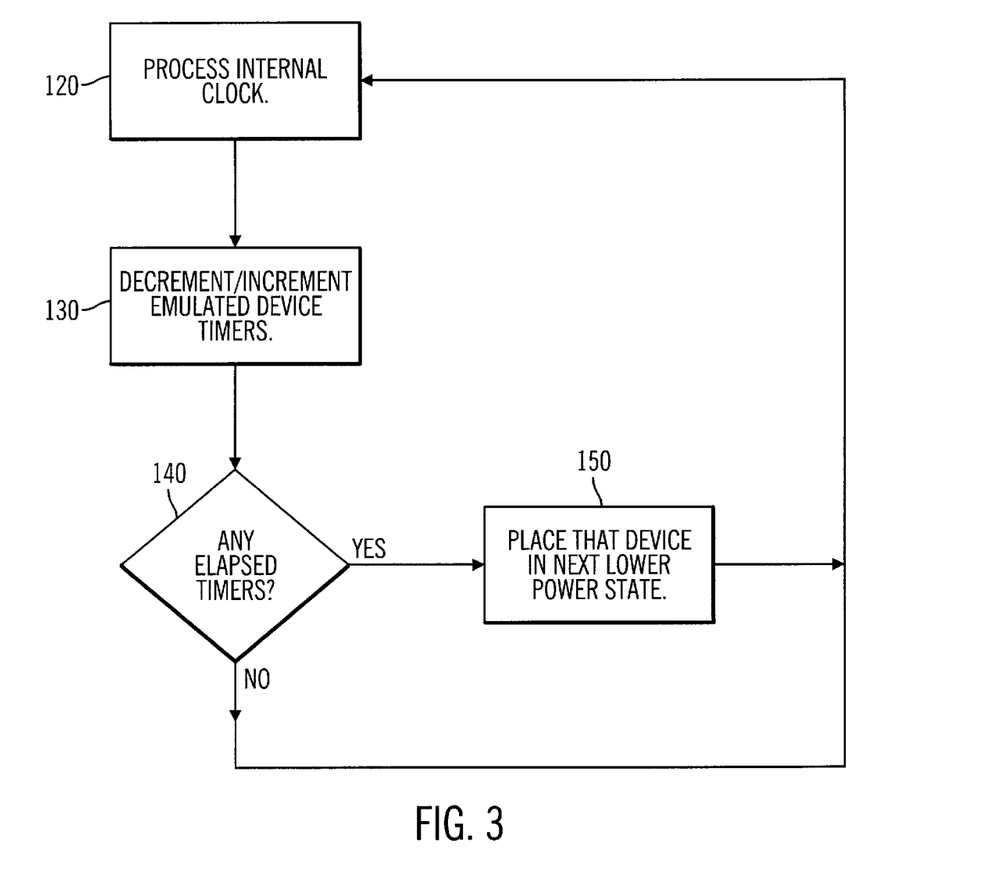
FIG. 3 is a flow-chart diagram of a timer process in accordance with the present invention.

FIG. 3 is a flowchart illustrating an implementation of the timer operation. An interval timer block 120 generates an interval signal on every predetermined interval (for example, 1 second). The interval signal causes each timer associated with a given I/O device to be changed (decremented/incremented) in block 130. The logic flow then moves to decision block 140 where it is determined whether any time out values have elapsed. If the answer is NO, then the logic flow returns to the process interval timer block 120. If the answer is YES, then the logic flow goes to block 150 and places that device in the next lower power state and resets its timer to the second time out value (if it has one).

In a further aspect of the present invention, software may be included to determine whether the electronic system is operating from a substantially steady state power source, i.e., not a battery. If it determines that the electronic system is being powered by an unlimited power supply, then the software will function to disable the power management function that is based on the emulated timers in the PMA software.

The present invention automates power management for I/O devices and significantly reduces the cost of device deployment in an electronic system. The invention reduces the amount of hardware which must be ported to in order to incorporate an I/O device into a power management system. This accordingly reduces the amount of hardware that must be debugged. Likewise, this invention reduces the cost and complexity of chip sets that will use power management.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method for managing power in an electronic system that includes a processor, operating system software controlling said processor and capable of controlling a plurality of input/output devices, each of said input/output devices having a full power-on state and at least one power reduction state and each being controlled by an associated device driver, said method comprising the steps of:

loading power management application (PMA) software, communication software, and template software into said electronic system;

wherein said template software includes a data structure for a name, a time-out value for a full power-on state and an application programming interface (API) for power up or power lower for said device;

wherein said communication software is loaded into the device drivers of devices that are to be subject to power management and functions to facilitate communication between said device and said PMA software;

wherein said template software is functional to translate said API of said device to an API of said communication software;

initializing code in said communication software in each of said device drivers to be subject to power management to create a thread for its device driver with a specific ID in order to support asynchronous communication with said PMA software;

initializing said PMA software with at least said full power-on time-out value for each of said device drivers subject to power management;

associating in said PMA software a different timer with each of a plurality of said device drivers subject to power management, said timers being external to said device drivers, and initializing each of said timers in accordance with the time out value for its associated device driver;

monitoring each of said timers and if a given one of said timers associated with a given one of said device drivers has a value indicative that its time-out value has been reached, then awakening said thread for the given device driver;

said given device driver having said awakened thread acting to call said PMA software for instructions;

said PMA software instructing said given device driver upon receipt of said call to lower at least one power level; and resetting a particular one of said timers when the device driver associated with said timer indicates a usage event for its associated device, and powering to a higher power said associated device if it is not at a full power-on state.

2. A method as defined in claim 1, wherein at least one of said input/output devices includes at least two different power reduction states; and wherein said template software in said loading step includes a reduction state time-out value for one of said power reduction states;

wherein said PMA software initializing step includes the step of providing said time-out value for said one of said power reduction states to said PMA software; and further comprising the steps of:

said communication software for a given one of said device drivers notifying said PMA software of a change to a different power level in response to a PMA software instructing step;

setting said timer associated with said given device driver in accordance with said time-out value for said one of said power reduction states; and monitoring when said timer set in accordance with said time-out value for said one of said power reduction states has reached a value indicative that said reduction state time-out value has elapsed, and then awakening said thread for that associated device driver.

3. A method as defined in claim 1, further comprising the steps of:

detecting when said electronic system is obtaining power from a non-battery power source; and upon said detection, operating said device drivers without said PMA software performing any power-lower functions based on time-outs.

4. A method as defined in claim 1, further comprising the step of:

if a designated one of said devices is to be powered to a higher power, causing a second device driver to power its associated device to a higher power if said second device is not at full power-on.

5. A method as defined to claim 1, further comprising the step of:

if a designated one of said devices, which designated device is not subject to power management, is to be powered to a higher power, causing a second device driver that is subject to power management to power its associated device to a higher power, if said device is not at full power-on.

6. A method as defined in claim 1, further comprising the steps of:

maintaining a log of a number of indications of power-up events for at least one device driver subject to power management over a period of time; and varying at least one time-out value for said at least one device driver in accordance with the number of indications of power-up events of said at least one device driver during said period of time.

7. A method as defined in claim 1, wherein said timers are implemented by a plurality of memory locations;

wherein said initializing step comprises the step of loading each of a plurality of said memory locations with the respective full power-on time-out value for the device driver to which the timer is associated;

wherein said changing value step comprises the step of decrementing said memory locations at a predetermined interval; and wherein said monitoring step comprises the step of monitoring said memory locations to determine when one of said memory locations has been decremented to zero.

8. A method as defined in claim 1, further comprising the step of displaying information about a plurality of said drivers that are subject to power management.

9. A method as defined in claim 1, wherein said loading step includes the step of adding said template software to said device driver that are to be subject to power management.

10. A method for managing power in an electronic system having a plurality of input/output devices, each of said input/output devices having a full power-on state and at least one power reduction state and each being controlled by an associated device driver, said method comprising the steps of:

initializing a power management logic separate from said device drivers to receive at least one time-out value for each of said device drivers to be subject to power management creating a timer thread for each of said device drivers;

assigning a different timer in said power management logic to a different one of said device drivers to be subject to power management, said timers being disposed external of said device drivers;

initializing each of a plurality of said assigned timers to an individual predetermined value set in accordance with the at least one time out value of the assigned device driver for that timer;

changing said individual predetermined value held in each of said timers at a predetermined interval;

monitoring a plurality of said timers and determining when said predetermined value in one of said timers indicates that said time-out value for the assigned device driver has elapsed, and sending a power reduction instruction to said assigned device driver by way of the associated timer; and resetting a given one of said timers to its individual predetermined value at any time when the device driver associated with said timer indicates a usage event of its associated device driver, and powering said associated device to a higher power level if it is not at full power-on.

11. A method as defined in claim 10, wherein at least one of said input/output devices includes at least two different power reduction states; and wherein said power management logic initializing step includes the step of providing a time-out value for one of the power reduction states of said at least one input-output device to said power management logic; and further comprising the steps of:

after a power reduction instruction to said at least one of said input/output devices, setting said timer associated with the device driver for said at least one input\output device in accordance with said time-out value for said power reduction state; and monitoring when said timer set in accordance with said time-out value for said power reduction state has reached a value indicative that said reduction state time-out value has elapsed, and then sending a power reduction instruction to said assigned device driver.

12. A method as defined in claim 10, further comprising the steps of:

detecting when said electronic system is obtaining power from a non-battery power source; and upon said detection, operating said device drivers without said power management logic performing any power-lower functions based on time-outs.

13. A method as defined in claim 10, further comprising the step of:

if a designated one of said devices is to be powered to a higher power, causing a second device driver to power its associated device to a higher power, if said device is not at full power-on.

14. A method as defined in claim 10, further comprising the step of:

if a designated one of said devices, which designated device is not subject to power management, is to be powered to a higher power, causing a second device driver that is subject to power management to power its associated device to a higher power, if said device is not at full power-on.

15. A method as defined in claim 10, further comprising the steps of:

maintaining a log of a number of indications of power-up events for at least one device driver subject to power management over a period of time; and varying at least one time-out value for said at least one device driver in accordance with the number of indications of power-up events of said at least one device driver during said period of time.

16. A method as defined in claim 10, wherein said timers are implemented by a plurality of memory locations;

wherein said initializing step comprises the step of loading each of a plurality of said memory locations with the respective full power-on time-out value for the device driver to which that memory location is assigned;

wherein said changing value step comprises the step of decrementing said memory locations at said predetermined interval; and wherein said monitoring step comprises the step of monitoring said memory locations to determine when one of said memory locations has been decremented to zero.

17. A method as defined in claim 10, further comprising the step of displaying information about a plurality of said device drivers that are subject to power management.

18. A program product comprising:

at least one computer usable medium having computer readable program code means embodied therein to configure a computer to manage power, wherein operating system software controls said computer and is capable of controlling a plurality of input/output devices, each of said input/output devices having a full power-on state and at least one power reduction state and each being controlled by an associated device driver, said computer readable program code means in said program product comprising:

first computer readable code means designed to be added to each of said device drivers that is subject to power management, said first computer readable code means including a data structure for a name and at least one time-out value for a full power-on state and an application programming interface (API) for power up or power lower for said device, said first computer readable code means functional to cause the computer to translate said API of said device to an API of a second computer readable code means;

said second computer readable code means designed to be added to each of said device drivers that is subject to power management to facilitate communication between a power management application (PMA) computer readable code means and said device associated with said device driver, said second computer readable code means having said API;

third computer readable code means to cause the computer to initialize said second computer readable code means to create a thread for its device driver with a specific ID in order to support asynchronous communication with said PMA computer readable code means; said PMA computer readable code means to cause the computer to provide a separate timer associated with each of said device drivers, but external to said device drivers;

wherein said second computer readable code means includes code to cause the computer to initialize said PMA computer readable code means to associate said full power-on time-out value for each of said devices with a different one of said timers;

wherein said PMA computer readable code means includes code to cause the computer to monitor each of said timers and if a given one of said timers associated with a given one of said device drivers has a value indicative that its time-out value has been reached, then awakening said thread for the given device driver associated with that time-out value;

wherein said third computer readable code means includes code to cause the computer to call said PMA computer readable code means for instructions upon awakening of said thread;

wherein said PMA computer readable code means includes code to cause the computer to communicate to said second computer readable code means of said given device driver upon receipt of said call to lower at least one power level; and wherein said PMA computer readable code means includes code to cause the computer to reset a particular one of said timers when the second computer readable code means of the device driver associated with said timer indicates a usage event for its associated device, and communicating to said device driver to power to a higher power if it is not at a full power-on state.

19. A program product as defined in claim 18, wherein at least one of said input/output devices includes at least two different power reduction states; and wherein said data structure in said first computer readable code means includes a reduction state time-out value for one of said power reduction states;

wherein said second computer readable code means causes said computer to provide said time-out value for said one of said power reduction states to said PMA computer readable code means;

said second computer readable code means for a given one of said device drivers including code to cause the computer to notify said PMA computer readable code means of a change to a different power level;

wherein said second computer readable code means includes code to cause the computer to initialize said timer associated with said given device driver in accordance with said time-out value for said one of said power reduction states; and wherein said PMA computer readable code means includes code to cause the computer to monitor when said timer set in accordance with said time-out value for said one of said power reduction states has reached a value indicative that said reduction state time-out value has elapsed, and then awakening said thread for that associated device driver.

20. A program product as defined in claim 18, further comprising:

computer readable code means to cause the computer to detect when said electronic system is obtaining power from a non-battery power source, and upon said detection, operating said device drivers without said power management application performing any power-lower functions based on time-outs.

21. A program product as defined in claim 18, further comprising:

computer readable code means to cause the computer, if a designated one of said devices is to be powered to a higher power, to signal a second device driver to power its associated device to a higher power if said device is not at full power-on.

22. A program product as defined in claim 18, further comprising:

computer readable code means, if a designated one of said devices which designated device is not subject to power management is to be powered to a higher power, to cause the computer to power a second device that is subject to power management to a higher power, if said device is not at full power-on.

23. A program product as defined in claim 18, further comprising:

computer readable code means to cause the computer to maintain a log of a number of indications of power-up events for at least one device driver subject to power management over a period of time, and to vary at least one time-out valve for said at least one device driver in accordance with the number of indications of power-up events of said at least one device driver during said period of time.

24. A program product as defined in claim 18, wherein said PMA computer readable code means includes code to cause the computer to implement said timers by a plurality of decremented memory locations, wherein said second computer readable code means includes code to cause initialization of each of a plurality of said memory locations with the respective full power-on time-out value for the device driver to which the timer is associated;

wherein said PMA computer readable code means includes code to cause the computer to decrement said memory locations at a predetermined interval, and to monitor said memory locations to determine when one of said memory locations has been decremented to zero.

25. A program product comprising:

at least one computer usable medium having computer readable code means embodied therein for configuring a computer to manage power, wherein operating system software controls said computer and is capable of controlling a plurality of input/output devices, each of said input/output devices having a full power-on state and at least one power reduction state and each being controlled by an associated device driver having an associated timer thread, said computer readable program code means comprising:

power management application (PMA) computer readable code means for causing said computer to form a different timer for each of a plurality of said devices subject to power management, said timers being formed external to said device drivers associated with said devices;

first computer readable code means for causing said computer to initialize each of said different timers in accordance with the time out value of the device associated with that timer;

second computer readable code means to cause said computer to run said timers, to monitor said timers, and to determine when one of said timers has a value indicative that the time out value for its associated device has elapsed, and sending a power reduction instruction to said associated device by way of the associated timer; and third computer readable code means for causing the computer to reset a given one of said timers to the time out value for its associated device at any time when the device driver associated with said timer indicates a usage event of its associated device, and powering said associated device to a higher power level if it is not at full power on.

* * * * *